(12) United States Patent
Kawasaki et al.

(10) Patent No.: US 7,499,178 B2
(45) Date of Patent: Mar. 3, 2009

(54) OBLIQUE INCIDENCE INTERFEROMETER

(75) Inventors: Kazuhiko Kawasaki, Ushiku (JP); Yoshimasa Suzuki, Tsukuba (JP); Reiya Ootao, Tsukuba (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 0 days.

(21) Appl. No.: 11/819,675

(22) Filed: Jun. 28, 2007

(65) Prior Publication Data

US 2008/0002212 A1    Jan. 3, 2008

(30) Foreign Application Priority Data

Jun. 30, 2006  (JP) .............................. 2006-180573
May 29, 2007  (JP) .............................. 2007-141556

(51) Int. Cl.
    *G01B 9/02*    (2006.01)
(52) U.S. Cl. ...................................... 356/495; 356/512
(58) Field of Classification Search ................. 356/495
    See application file for complete search history.

(56) References Cited

U.S. PATENT DOCUMENTS

| | | | |
|---|---|---|---|
| 6,552,807 B1 * | 4/2003 | Mitsutani et al. ............ | 356/512 |
| 6,570,661 B2 | 5/2003 | Kanda et al. | |
| 2006/0146340 A1 * | 7/2006 | Szwaykowski et al. ...... | 356/495 |

FOREIGN PATENT DOCUMENTS

| | | |
|---|---|---|
| EP | 0 226 658 A1 | 7/1987 |
| EP | 0 575 095 A1 | 12/1993 |
| JP | A 4-286904 | 10/1992 |
| JP | A 2000-18912 | 1/2000 |
| JP | A 2001-194132 | 7/2001 |

OTHER PUBLICATIONS

Otani et al., "Precise measurement of nonoptical surface by oblique incidence interferometer," *SPIE*, vol. 3478, Jul. 1998, pp. 214-217.

* cited by examiner

*Primary Examiner*—Hwa (Andrew) S Lee
*Assistant Examiner*—Jonathon D Cook
(74) *Attorney, Agent, or Firm*—Oliff & Berridge, PLC

(57) ABSTRACT

An oblique incidence interferometer is provided for applying a light at a certain angle from the normal to a measurement surface of a target to be measured and measuring a light reflected from the target. A beam splitter element and beam synthesizer element splits the light from a light source into a measurement light to be applied to the target and a reference light serving as the measurement reference. It also orthogonalizes the polarization directions of the measurement light reflected from the target and the reference light and synthesizes the lights. A three-way split prism splits the synthesized light into a plurality of split lights. Imaging units are provided to capture a plurality of interference fringe images formed in accordance with the plurality of split lights. A ¼-waveplate is provided on either one of an entry side and an exit side of the three-way split prism. Polarizers are provided on imaging surfaces of the imaging units.

14 Claims, 10 Drawing Sheets

OBLIQUE INCIDENCE INTERFEROMETER

CROSS-REFERENCE TO RELATED APPLICATION

This application is based upon and claims the benefit of prior Japanese Patent Applications No. 2006-180573, filed on Jun. 30, 2006 and No. 2007-141556, filed on May 29, 2007, the entire contents of which are incorporated herein by reference.

BACKGROUND OF THE INVENTION

1. Field of the Invention

The present invention relates to an oblique incidence interferometer for applying a light obliquely to a target to be measured and measuring the form of the target in accordance with interference of a light reflected from the target with a reference light.

2. Description of the Related Art

A conventional normal incidence interferometer is known as a high-precision measuring technology that uses the wavelength of light as the unit of length. There is a problem in the conventional technology, however, because it is not possible to measure the form of the target having discrete steps larger than half the wavelength or large undulations with a variation in height larger than half the wavelength between adjacent pixels in an image. On the contrary, oblique incidence interferometers have been known as those capable of measuring large roughness (For example, Japanese Patent disclosures Nos. 4-286904, 2000-18912 and 2001-194132). These oblique incidence interferometers apply a light obliquely to the target to obtain a reflected light, thereby reducing the variation in wave front relative to the roughness of the target as intended. By utilizing this feature, the oblique incidence interferometer is able to measure larger rough shapes than the normal incidence interferometer can.

A configuration example of the oblique incidence interferometer of prior art is shown in FIG. 10. This oblique incidence interferometer mainly comprises an illuminator unit 100, and a detector unit 300.

The illuminator unit 100 includes a light source 101, lenses 102, 103, a beam splitter element 104, and a beam synthesizer element 105.

The detector unit 300 includes a lens 301, and an imaging element 302.

The light emitted from the light source 101 travels through the lenses 102, 103 and enters the beam splitter element 104 as a parallel beam, which is split into two beams. One of the split beams is applied obliquely to the surface of a target 200 to be measured. The light reflected from the target 200 is synthesized in the beam synthesizer element 105 with the other of the beams split at the beam splitter element 104. The synthesized beam is lea through the lens 301 and captured as an interference fringe image on the imaging element 302. For beam split and synthesis, a beam splitter and a diffraction grating may be used in general. Another known oblique incidence interferometer comprises an illuminator unit 100' that includes a triangular prism 106, as shown in FIG. 11, instead of the beam splitter element 104 and the beam synthesizer element 105. This oblique incidence interferometer is configured to apply a laser light through the triangular prism 106 to the target to cause interference between the lights reflected from the prism surface and the target surface.

In the case of the oblique incidence interferometer as described above, the difference in height between adjacent fringes in the interference fringes obtained at the oblique incidence interferometer is represented by $\lambda/(2\cos\theta)$, where $\theta$ denotes the incident angle of the laser light from the normal to the target surface, and $\lambda$ denotes the wavelength of the laser light. Thus, a larger incident angle $\theta$ allows measurements to be executed in a wider range than the conventional normal incidence interferometer can.

Analysis of the interference fringe images obtained from FIG. 10 allows the form of the target 200 to be acquired as numeral data. As a method of precisely analyzing interference fringe images, a phase shifting method is used in general. The phase shifting method is a technique of shifting the phase between the beam from the reference surface and the beam from the target, capturing a plurality of interference fringe images, and analyzing the interference fringe images. Shifting the phase of the interference fringe in such the configuration of FIG. 10 requires a process of moving the target relative to the oblique incidence interferometer. Otherwise, it is required to arrange an optical beam-delay element on the optical path of either the reference beam or the measurement beam, or execute a process of shifting the wavelength of the light source.

The phase shift given to the interference fringe by the relative displacement of the target requires a precise displacement of the order of nanometers to be given and causes an error in accordance with the displacement accuracy. Alternatively, the phase shift performed by variations in wavelength requires an expensive light source capable of varying the wavelength precisely in accordance with the measurement accuracy. It also requires a time for shifting the phase of the interference fringe to capture a plurality of interference fringe images. In addition, during acquisition of data, the target must remain stationary relative to the oblique incidence interferometer. Therefore, an occurrence of vibrations in the measurement environment during measurement disables the measurement.

The oblique incidence interferometer of prior art requires a mechanism capable of executing movements with an accuracy of nanometers during the phase shift given to the interference fringe, or an expensive light source capable of varying the wavelength with sufficient accuracy. Such the requirement makes it difficult to produce devices and provides finished products or devices at higher prices. During acquisition of a plurality of interference fringe images required for analysis, targets to be measured are limited to those that remain stationary with the order of nanometers. Therefore, targets and use environments are limited from the nature of the device.

SUMMARY OF THE INVENTION

The present invention therefore has an object to provide an oblique incidence interferometer capable of performing measurements in environments even in the presence of vibrations, such as workplaces, at a low price, through achievement of the oblique incidence interferometer operable with high precision and at high speed.

The present invention provides an oblique incidence interferometer for applying a light at a certain angle from the normal to a measurement surface of a target to be measured and measuring a light reflected from the target, comprising: a light source; a beam splitter/synthesizer unit configured to split the light from the light source into a measurement light to be applied to the target and a reference light serving as the measurement reference, and configured to orthogonalize the polarization directions of the measurement light reflected from the target and the reference light and synthesize the lights to yield a synthesized light: a beam splitter unit configured to split the synthesized light into a plurality of split lights; a plurality of imaging units configured to capture a plurality of interference fringe images formed in accordance with the plurality of split lights; a ¼-waveplate provided on either one of an entry side and an exit side of the beam splitter unit; a plurality of polarizers provided on imaging surfaces of the plurality of imaging units and arranged having respective different polarization axes; and an operation unit configured to compute a surface form of the target based on the interference fringe images captured by the imaging units and resulted from the plurality of split lights having phases shifted through the polarizers.

Such the configuration makes it possible to shift the phase using the beam splitter/synthesizer unit, the beam splitter unit, the ¼-waveplate, and the polarizers in the absence of any mechanically movable components. It also allows for instantaneous measurements and highly reproducible measurements. In addition, it does not require a small translation mechanism for shifting the phase of interference fringes and an expensive wavelength-variable light source, and accordingly it can achieve productions at lower prices.

The present invention also provides an oblique incidence interferometer for applying a light at a certain angle from the normal to a measurement surface of a target to be measured and measuring a light reflected from the target, comprising: a light source; a beam splitter/synthesizer unit configured to split the light from the light source into a measurement light to be applied to the target and a reference light serving as the measurement reference, and configured to orthogonalize the polarization directions of the measurement light reflected from the target and the reference light and synthesize the lights to yield a synthesized light; a beam splitter unit configured to split the synthesized light into a plurality of split lights; a first polarizer interposed in an optical path of a first split light split at the beam splitter unit, the first polarizer having a first polarization axis; a second polarizer interposed in an optical path of a second split light split at the beam splitter unit, the second polarizer having a second polarization axis set within the same quadrant as the first polarization axis; a third polarizer interposed in an optical path of a third split light split at the beam splitter unit, the third polarizer having a third polarization axis set within a different quadrant from the second polarization axis; and a ¼-waveplate interposed in the optical path of the second split light and having a fast axis orientation and a slow axis orientation almost coincident with the polarization direction of the synthesized light.

Such the configuration makes it possible to shift the phase using the beam splitter/synthesizer unit, the beam splitter unit, the first through third polarizers, and the ¼-waveplate in the absence of any mechanically movable components. Therefore, it allows for instantaneous measurements and highly reproducible measurements. In addition, it does not require a high-precision, small translation mechanism for shifting the phase of interference fringes and an expensive wavelength-variable light source, and accordingly it can achieve productions at lower prices.

The beam splitter/synthesizer unit may include a beam splitter element operative to split the light from the light source into the reference light and the measurement light, a ½-waveplate operative to convert the reference light split at the beam splitter element into a linear polarized light orthogonal to the measurement light, and a beam synthesizer element operative to synthesize the reference light with the measurement light reflected from the target.

The beam splitter/synthesizer unit may be a triangular prism.

The triangular prism may have a coat thereon to split the measurement light and the reference light in accordance with the polarization directions.

The oblique incidence interferometer may further comprise an element arranged between the triangular prism and the target to split the measurement light and the reference light in accordance with the polarization directions.

The oblique incidence interferometer may further comprise a driver unit operative to cause at least one of relative translation and rotation of the target in a plane almost parallel with the target.

The beam splitter/synthesizer unit may include means for splitting the light from the light source into two light beams having orthogonal polarization planes and generating two collimated beams having different optical axes and a certain diameter, a triangular prism operative to transmit one of the two beams therethrough and reflect the other therefrom, thereby splitting the two beams into a measurement light and a reference light serving as the measurement reference, and operative to synthesize the measurement light with the reference light to yield a synthesized light, and a spatial filter unit operative to pass the synthesized light therethrough and reject a noise light caused from one of the two beams reflected from the triangular prism and a noise light caused from the other of the two beams transmitted through the triangular prism.

The target may be tilted at a certain angle such that the spatial filter unit forms an optical axis to pass only the synthesized light.

The means for splitting the light and generating two beams may include a splitter element operative to split the light beam from the light source into two light beams having orthogonal polarization planes, a first lens for collecting the two light beams, and a second lens for forming two collimated beams having different optical axes.

The means for splitting the light and generating two beams may include a splitter element operative to split the light beam from the light source into two light beams having orthogonal polarization planes, a pair of optical fibers operative to receive the two light beams, respectively, and a lens for forming two collimated beams having different optical axes.

The spatial filter unit may include a first lens, an iris located in the proximity of the focus of said first lens, and a second lens located downstream from the iris.

Such the configuration makes it possible to obtain high-S/N interference fringes with a compact optical system in the absence of any mechanically movable components.

In accordance with the present invention, it is possible to provide a high-precision, high-speed, low-price oblique incidence interferometer capable of performing measurements of the form of a workpiece or a target to be measured in environments even in the presence of vibrations, such as workplaces.

DETAILED DESCRIPTION OF THE EMBODIMENTS

An oblique incidence interferometer according to an embodiment of the present invention will be described below with reference to the drawings. In the figures, a double-headed arrow schematically indicates a linear polarization component parallel with the page. A double-circle indicates a linear polarization component perpendicular to the page. A circular arrow indicates a clockwise or counterclockwise circular polarization component.

First Embodiment

An oblique incidence interferometer according to a first embodiment of the present invention is described with reference to FIG. 1.

Figure 1:
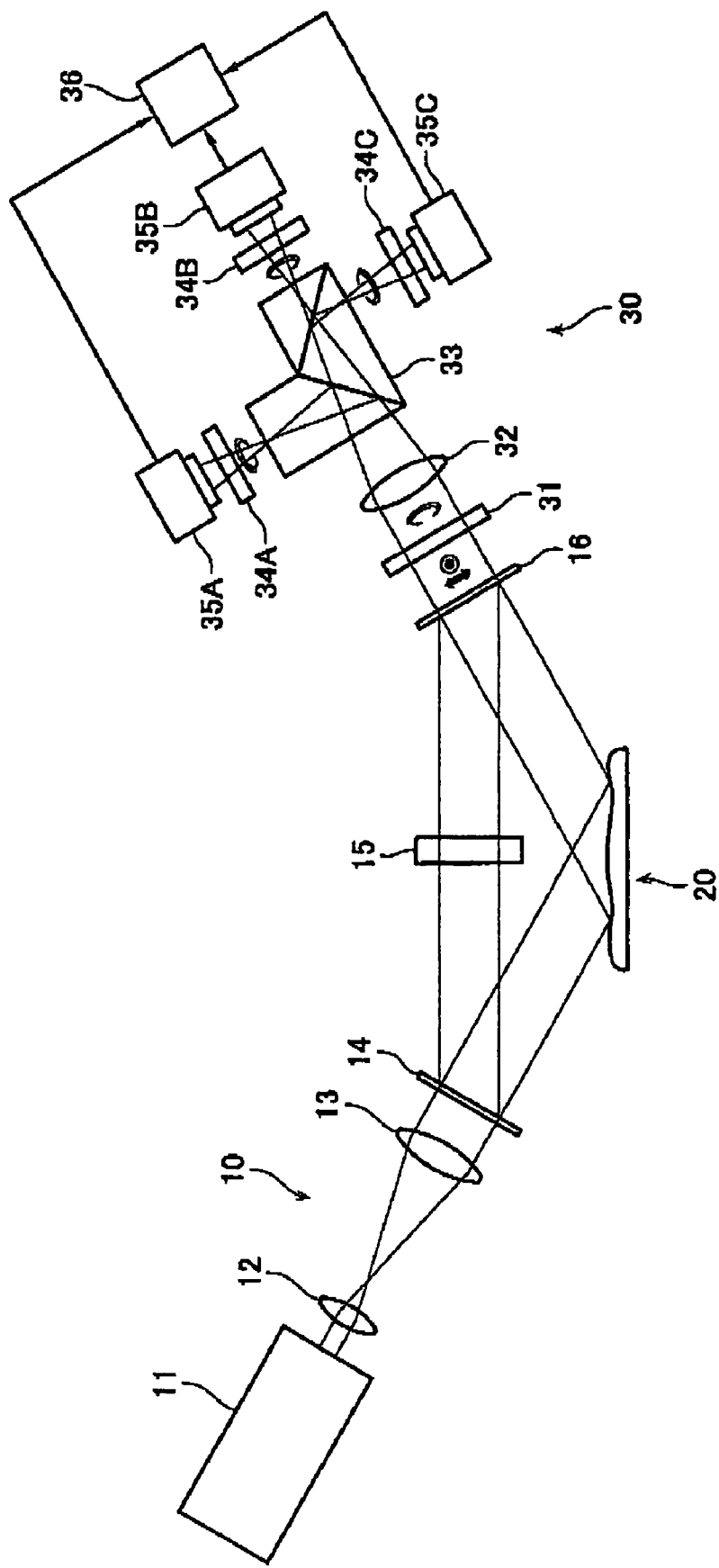
FIG. 1 shows a brief configuration of an oblique incidence interferometer according to a first embodiment of the present invention.

As shown in FIG. 1, the oblique incidence interferometer mainly comprises an illuminator unit 10, and a detector unit 30.

The illuminator unit 10 includes a light source 11, lenses 12, 13, a beam splitter element 14, a ½-waveplate 15, and a beam synthesizer element 16. In accordance with this arrangement, part of the light from the light source 11 is applied through the lenses 12, 13 and the beam splitter element 14 at a certain angle from the normal to a measurement surface of a target 20 to be measured. In the first embodiment, the light, which is applied to the target 20 through the beam splitter element 14 without changing direction, is used as a measurement light. In addition, the light, which is applied to the ½-waveplate 15 through the beam splitter element 14 with changing direction, is used as a reference light.

The detector unit 30 includes a ¼-waveplate 31, a lens 32, a three-way split prism 33, polarizers 34A-34C, imaging units 35A-35C, and an operational unit 36 operative to compute a surface form of the target 20 based on the images obtained at the imaging units 35A-35C.

The light emitted from the light source 11 travels through the lenses 12, 13 and enters the beam splitter element 14 as a parallel beam, which is split into two beams. One (the measurement light) of the split beams is applied obliquely to the surface of the target 20. On the other hand, the other (the reference light) of the beams split at the beam splitter element 14 is converted through the ½-waveplate 15 into a polarization component that is orthogonal to the polarization component before transmission. The measurement light reflected from the target 20 is synthesized in the beam synthesizer element 16 with the reference light split at the beam splitter element 14. The synthesized beam is converted through the ¼-waveplate 31 into a clockwise and a counterclockwise circular polarized light. The beam converted into the circular polarized light is split through the three-way split prism 33 in three directions. The beams split in three directions transmit through the polarizers 34A-34C arranged with different transmission axes and generate interference fringes having different phase shifts. These phase-shifted interference fringe images are captured at the imaging elements 35A-35C. The operational unit 36 applies an operational process in accordance with the publicly known phase shifting method to obtain a surface form of the target 20 based on the interference fringe images obtained at the imaging elements 35A-35C.

As described above, the oblique incidence interferometer according to the first embodiment of the present invention includes no mechanically movable component and accordingly provides highly reproducible measurement values. It is also possible to instantaneously obtain interference fringe images required for interference fringe analysis to execute a measurement in a short time. The use of a high-speed shutter allows for dynamic target measurements and form measurements in vibrating environments such as at production places and on machine tools. It does not require any high-precision movement mechanisms and optical elements for phase shift and any expensive wavelength-variable light sources, and provides an expectation for a low-price device.

Second Embodiment

An oblique incidence interferometer according to a second embodiment of the present invention is described next with reference to FIG. 2, in which the same components as those in the above-described first embodiment are denoted with the same reference numerals and omitted from the following description. Also in the second embodiment, the light, which is applied to the target 20 through the beam splitter element 14 without changing direction, is used as a measurement light. In addition, the light, which is applied to the ½-waveplate 15 through the beam splitter element 14 with changing direction, is used as a reference light.

Figure 2:
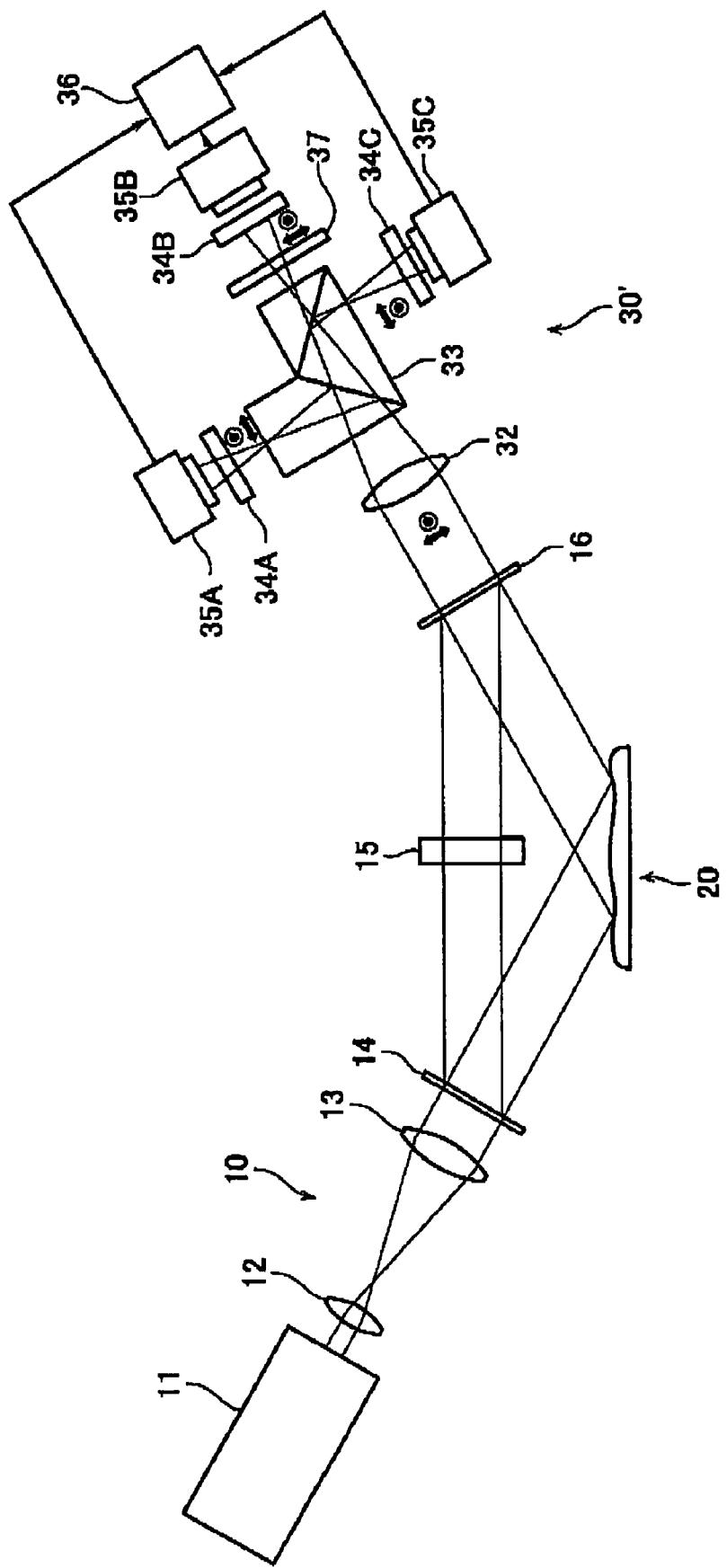
FIG. 2 shows a brief configuration of an oblique incidence interferometer according to a second embodiment of the present invention.

As shown in FIG. 2, the oblique incidence interferometer mainly comprises an illuminator unit 10, and a detector unit 30'. The illuminator unit 10 is similar to that in the first embodiment and the description thereof is omitted.

The detector unit 30' includes a ¼-waveplate 37 newly arranged between the polarizer 34B and the three-way split prism 33 while the ¼-waveplate 31 located between the lens 32 and the beam synthesizer element 16 is omitted, different from the first embodiment. The ¼-waveplate 37 has a fast axis orientation almost coincident with the polarization direction of one of the reference light and the measurement light and a slow axis orientation almost coincident with the polarization direction of the other of the reference light and the measurement light. This gives a relative phase difference of 90° to the reference light and the measurement light led into the polarizer 34B relative to the reference light and the measurement light led into the polarizers 34A, 34C.

The polarizers 34A, 34B, 34C have respective transmission axes set at angles of $\alpha$, $\alpha$, $\alpha+90°$. The angle $\alpha$ may have any value unless it is quite coincident with the polarization orientations of the reference light and the measurement light. The accuracy of installing the transmission axes of these polarizers exerts an influence on the analysis accuracy of the interference fringe though the accuracy may be sufficient if it falls within a range that allows the analysis error of the interference fringe.

This arrangement enables the imaging units 35A, 35B, 35C to capture the interference fringe images having phase shifts of 0°, 90°, 180°.

The oblique incidence interferometer of the second embodiment can be manufactured at a low price like in the first embodiment. The use of this interferometer makes it possible to measure the form of a target to be measured or a workpiece at workplaces or the like with high precision and at high speed.

Third Embodiment

An oblique incidence interferometer according to a third embodiment of the present invention is described next with reference to FIG. 3, in which the same components as those in the above-described first and second embodiments are denoted with the same reference numerals and omitted from the following description.

Figure 3:
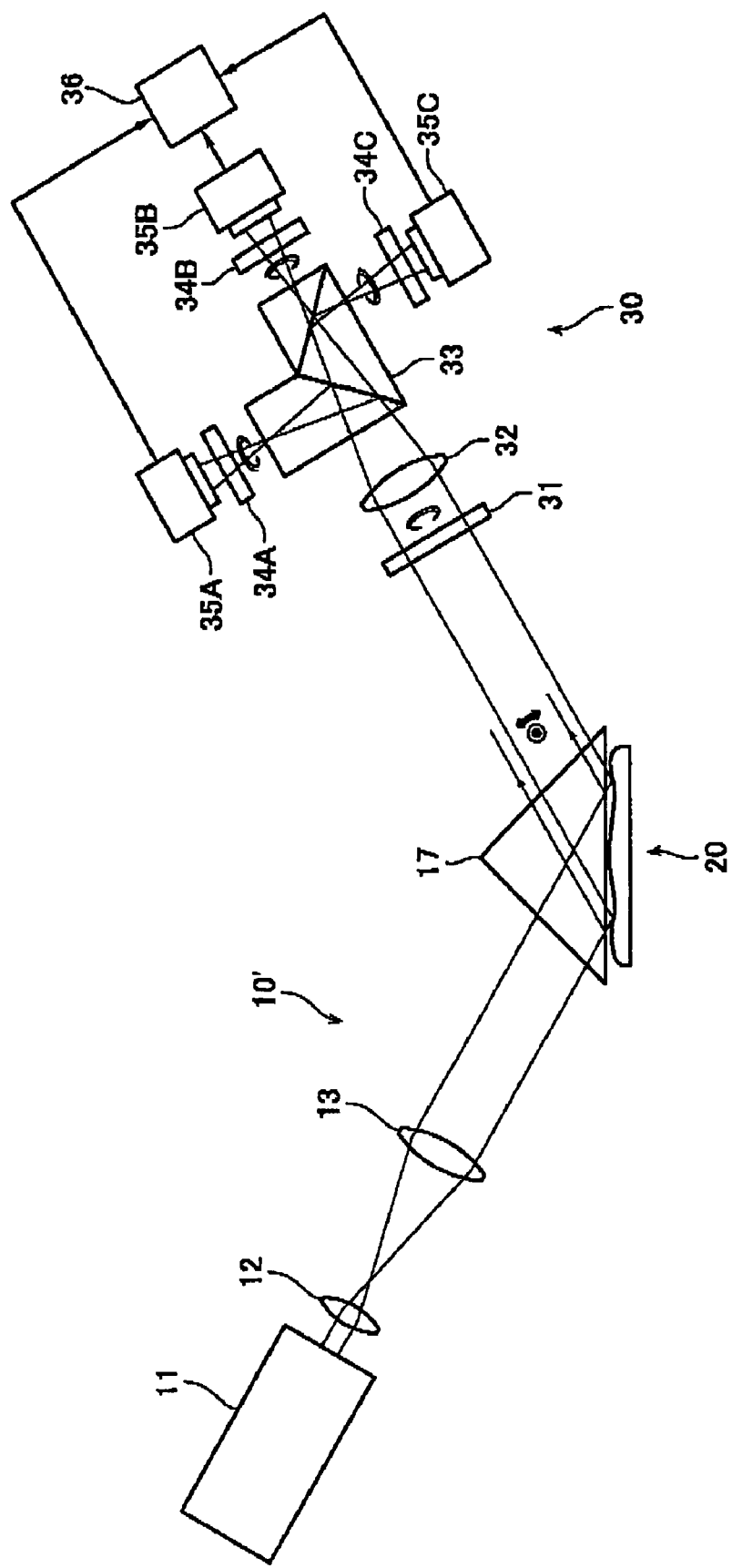
FIG. 3 shows a brief configuration of an oblique incidence interferometer according to a third embodiment of the present invention.

As shown in FIG. 3, the oblique incidence interferometer mainly comprises an illuminator unit 10', and a detector unit 30. The detector unit 30 is similar to that in the first embodiment and the description thereof is omitted.

The illuminator unit 10' includes a triangular prism 17, instead of the beam splitter element 14, the ½-waveplate 15 and the beam synthesizer element 16, different from the first embodiment.

When a beam is led into the triangular prism 17 at a certain particular angle, the relation between refractive indexes in the interior and exterior of the triangular prism 17 allows the beam of the parallel polarization to transmit, with respect to a plane formed by the beams of the incident light and the reflected light.

Namely, in the third embodiment, the light transmitted through the triangular prism 17 and applied to the target 20 serves as the measurement light while the light not transmitted through the triangular prism 17 but reflected at the inner surface of the triangular prism 17 serves as the reference light.

Thus, the use of the characteristic of the triangular prism 17 facilitates extraction of the measurement beam as a beam having a polarization orthogonal to the polarization of the reference beam.

The oblique incidence interferometer of the third embodiment can be manufactured at a low price like in the first and second embodiments. The use of this interferometer makes it possible to measure the form of a target to be measured or a workpiece at workplaces or the like with high precision and at high speed.

Fourth Embodiment

An oblique incidence interferometer according to a fourth embodiment of the present invention is described next with reference to FIG. 4, in which the same components as those in the above-described first through third embodiments are denoted with the same reference numerals and omitted from the following description.

Figure 4:
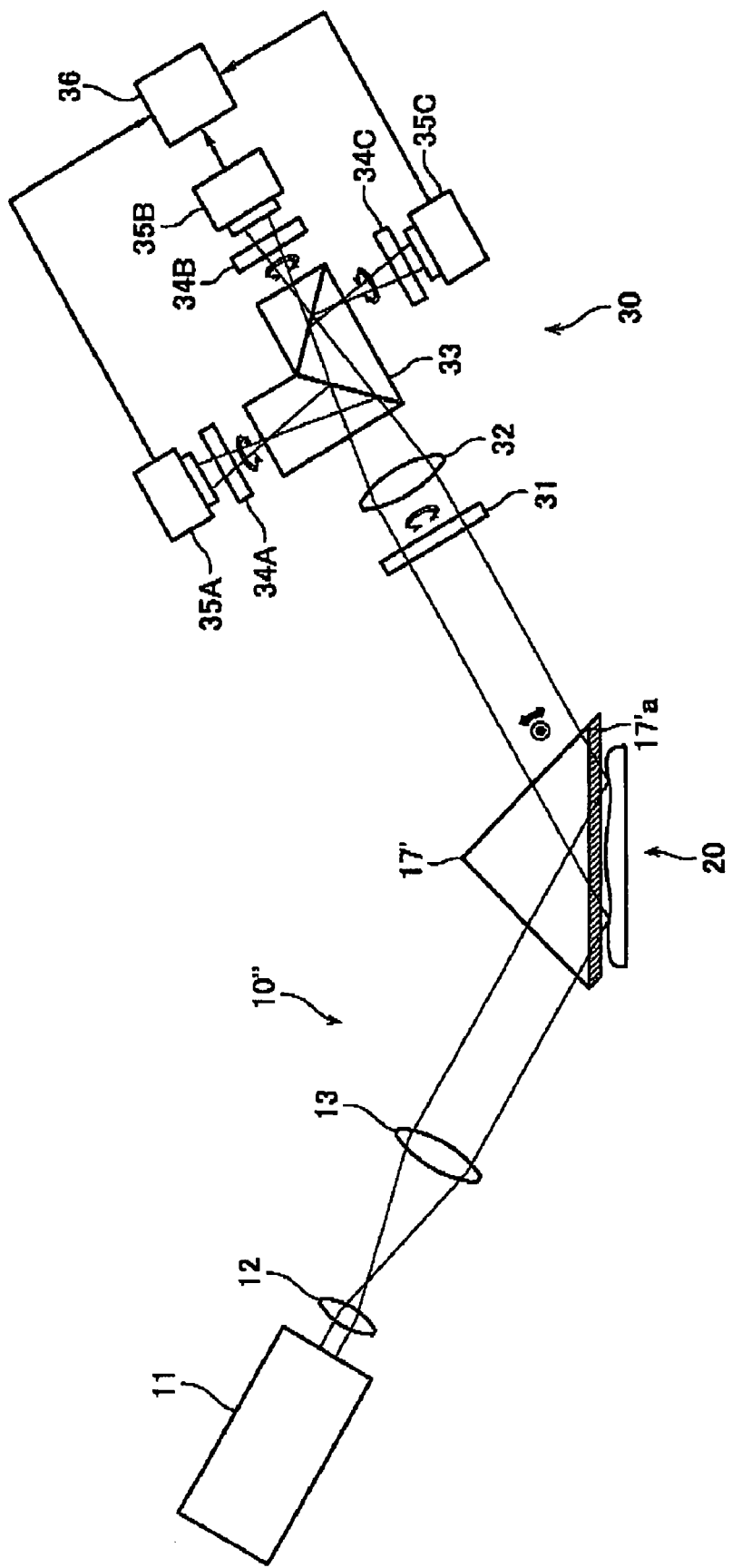
FIG. 4 shows a brief configuration of an oblique incidence interferometer according to a fourth embodiment of the present invention.

As shown in FIG. 4, the oblique incidence interferometer of the fourth embodiment differs only in a triangular prism 17' from the third embodiment. Namely, also in the fourth embodiment, the light transmitted through the triangular prism 17' and applied to the target 20 serves as the measurement light while the light not transmitted through the triangular prism 17' but reflected at the inner surface of the triangular prism 17 serves as the reference light.

The triangular prism 17' is provided with a coat 17'a on a location facing the target 20, for example, a wire-grid polarizer operative to separate a transmitted light and a reflected light in accordance with the orthogonal polarization.

The triangular prism 17' makes it possible to more efficiently split the reference beam and the measurement beam in accordance with the orthogonal polarization.

Instead of applying the coat 17'a to the triangular prism 17', a coated optical element may be arranged between the triangular prism and the target, thereby efficiently splitting the reference beam and the measurement beam.

The oblique incidence interferometer of the fourth embodiment can be manufactured at a low price like in the first through third embodiments. The use of this interferometer makes it possible to measure the form of a target to be measured or a workpiece at workplaces or the like with high precision and at high speed.

Fifth Embodiment

An oblique incidence interferometer according to a fifth embodiment of the present invention is described next with reference to FIG. 5, in which the same components as those in the above-described first through fourth embodiments are denoted with the same reference numerals and omitted from the following description.

Figure 5:
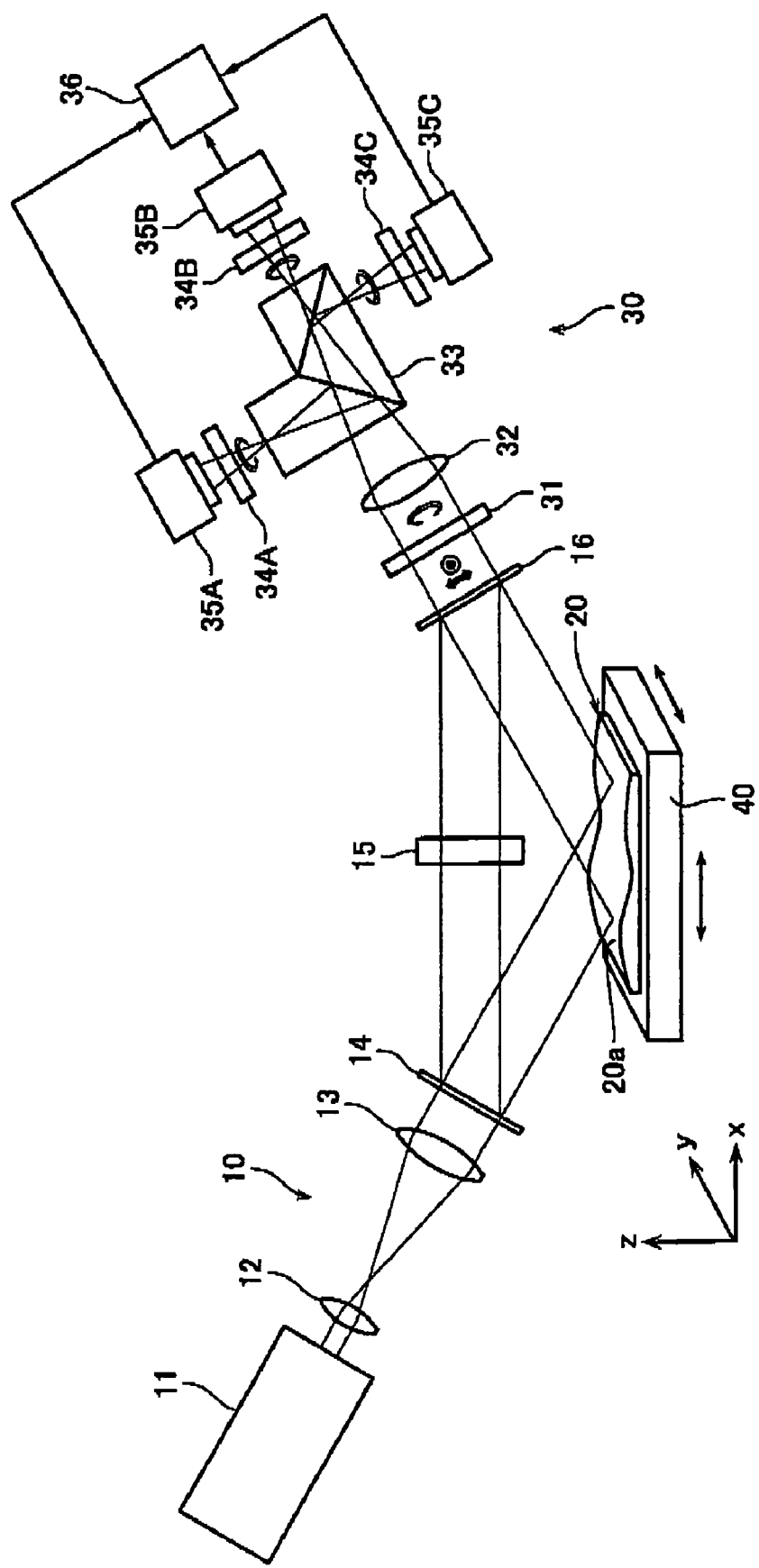
FIG. 5 shows a brief configuration of an oblique incidence interferometer according to a fifth embodiment of the present invention.

As shown in FIG. 5, the oblique Incidence interferometer mainly comprises an illuminator unit 10, a detector unit 30, and a mount 40 on which the target 20 is mounted. The illuminator unit 10 and the detector unit 30 are similar to those in the first embodiment and the description thereof is omitted.

In the fifth embodiment, the light, which is applied to the target 20 through the beam splitter element 14 without changing direction, is used as a measurement light, like the first embodiment. In addition, the light, which is applied to the ½-waveplate 15 through the beam splitter element 14 with changing direction, is used as a reference light.

The mount 40 for target scanning has a drive function of translating the target 20 within a measurement plane 20a.

Figure 6:
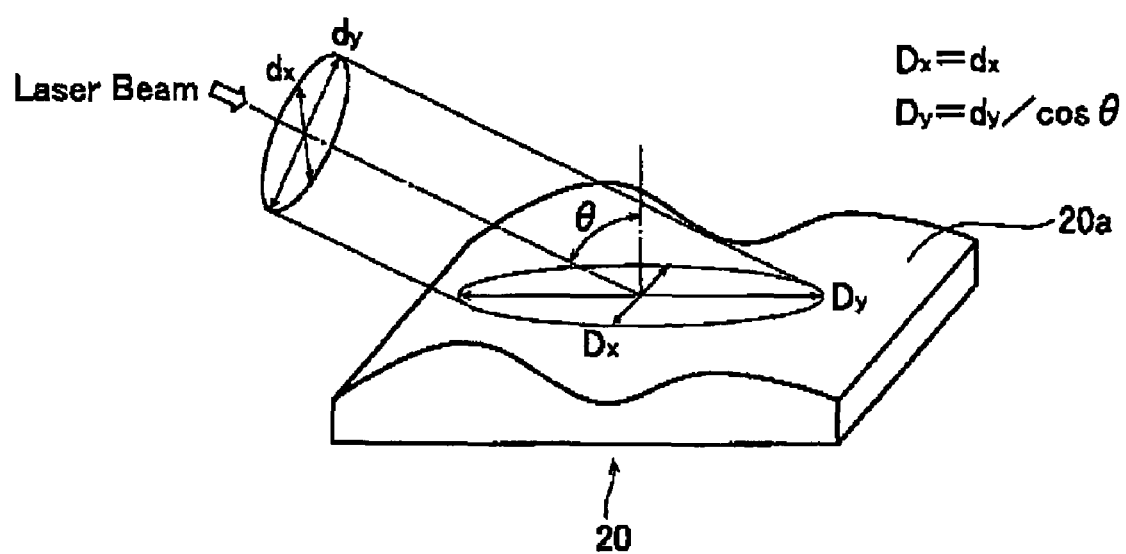
FIG. 6 illustrates a relation between the diameter of a beam obliquely applied to the target and the diameter of an illuminated spot formed on the target.

It is assumed herein that a laser beam (beam diameter: dx, dy) is led obliquely at an angle of θ from the normal to the measurement plane 20a of the target 20 as shown in FIG. 6. In this case, the illuminated spot of the laser beam elliptically spread on the target 20 has a diameter (Dx, Dy), which is represented by Dx=dx, Dy=(dy)/(cos θ)). This makes it possible to measure a region extended wider in the Dy-direction than the diameter of the laser beam. Therefore, on measurement of a larger flat form, a small number of scans in the Dy-direction may be sufficient to measure the form of a larger region efficiently in a short time.

A conventional oblique incidence interferometer may be used to measure a plurality of interference fringe images with an illuminated spot. In this case, analysis of the interference fringes of the illuminated spot requires the plurality of interference fringe images to be captured at site with a single imaging element. Therefore, an increase in the number of measurements in accordance with the size of the target also increases the measurement time. On the other hand, the use of the mount 40 for target scanning of the present embodiment makes it possible to capture images instantaneously with continuous scanning and greatly reduces the measurement time than the conventional method can.

The oblique incidence interferometer of the fifth embodiment can be manufactured at a low price like in the first through fourth embodiments. The use of this interferometer makes it possible to measure the form of a target to be measured or a workpiece at workplaces or the like with high precision and at high speed.

Sixth Embodiment

An oblique incidence interferometer according to a sixth embodiment of the present invention is described next with reference to FIG. 7, in which the same components as those in the above-described first through fifth embodiments are denoted with the same reference numerals and omitted from the following description.

In the sixth embodiment, the light, which is applied to the target 20 through the beam splitter element 14 without changing direction, is used as a measurement light, like the first embodiment. In addition, the light, which is applied to the ½-waveplate 15 through the beam splitter element 14 with changing direction, is used as a reference light.

Figure 7:
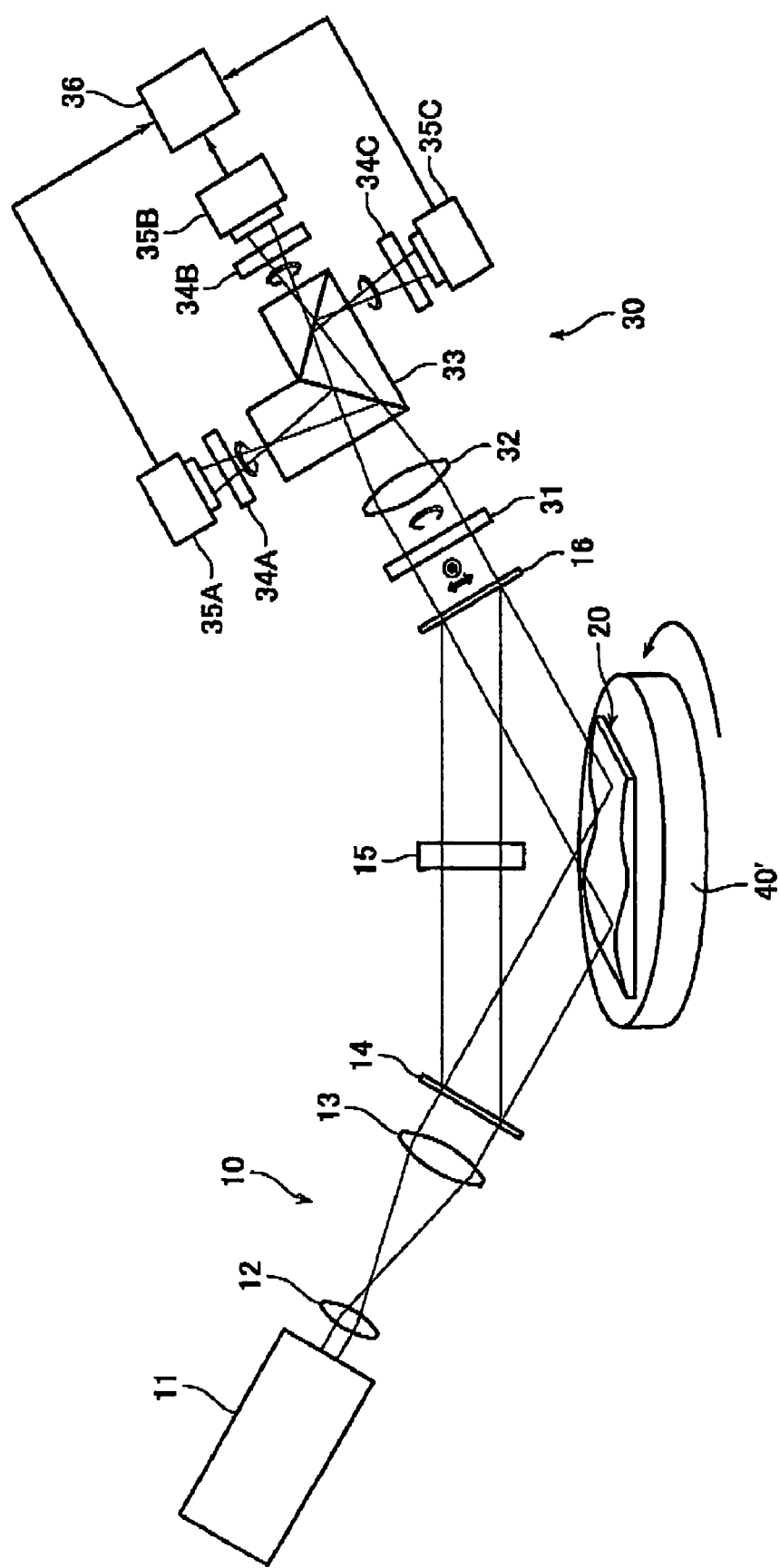
FIG. 7 shows a brief configuration of an oblique incidence interferometer according to a sixth embodiment of the present invention.

As shown in FIG. 7, the oblique incidence interferometer mainly comprises an illuminator unit 10, a detector unit 30, and a mount 40' for target scanning on which the target 20 is mounted. The illuminator unit 10 and the detector unit 30 are similar to those in the first embodiment and the description thereof is omitted.

The mount 40' for target scanning has a drive function of rotating the target 20 within a measurement plane. As described above, the illuminating spot from the light source elliptically spreads on the illuminated surface of the target 20 in accordance with the incident angle of the beam. Therefore, on measurement with the mount 40' for target scanning used to rotate the target 20, it is possible to efficiently scan a circular region of a diameter Dy for measurement.

The oblique incidence interferometer of the sixth embodiment can be manufactured at a low price like in the first through fifth embodiments. The use of this interferometer makes it possible to measure the form of a target to be measured or a workpiece at workplaces or the like with high precision and at high speed.

Seventh Embodiment

An oblique incidence interferometer according to a seventh embodiment of the present invention is described next with reference to FIG. 8, in which the same components as those in the above-described first through sixth embodiments are denoted with the same reference numerals and omitted from the following description.

Figure 8:
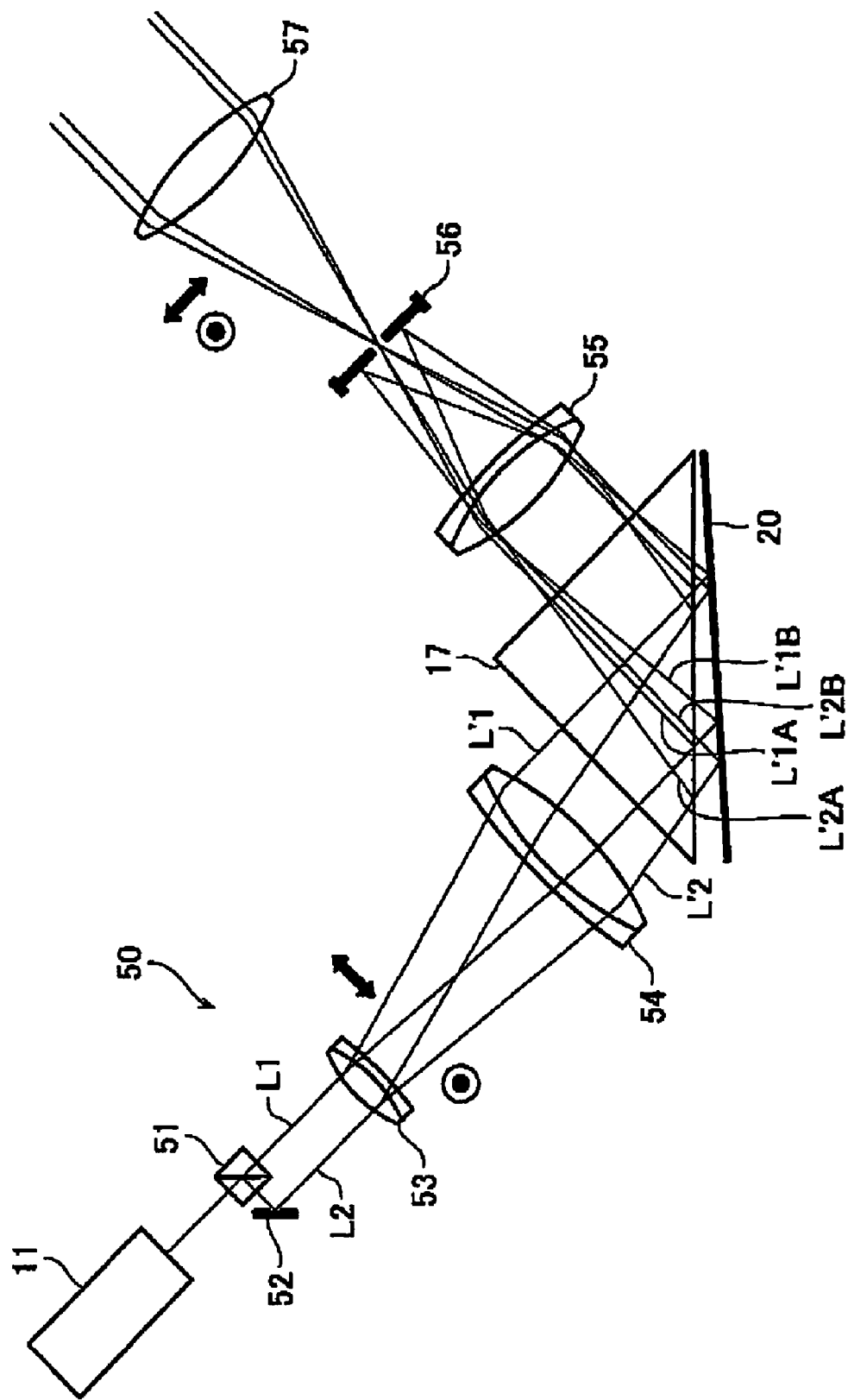
FIG. 8 shows a brief configuration of an oblique incidence interferometer according to a seventh embodiment of the present invention.

As shown in FIG. 8, in the oblique incidence interferometer of the seventh embodiment, an illuminator unit 50 is configured as follows. Namely, a splitter element 51 is provided on the optical path to split the light beam from the light source 11 in accordance with the polarization plane. The splitter element 51 splits the coherent laser beam from the light source 11 into two light beams L1, L2 having orthogonal polarization planes. The light beam L2 is reflected from a mirror 52. On the optical paths of the light beams L1, L2, a lens 53 is located for collecting two light beams L1, L2. On the optical path of the lens 53, a lens 54 is additionally arranged. The combination of the lenses 53 and 54 generates two collimated light beams L1', L2'. The two beams L1', L2' have orthogonal polarization planes and slightly deviated optical paths. The optical paths of the two light beams L1', L2' may not be parallel. A triangular prism 17 is arranged downstream therefrom. A lens 55 is arranged further downstream from the triangular prism 17 to receive a synthesized light of the reference light reflected from an oblique plane of the triangular prism 17 with the measurement light reflected from the surface 20a of the target 20. An iris 56 is provided in the vicinity of the focus of the lens 55. A lens 57 is provided downstream from the iris 56 to generate a collimated beam. The lens 55, the iris 56 and the lens 57 configure a spatial filter unit for removing optical components unnecessary for measurements as described later. The detector unit 30 is provided downstream from the lens 57.

The principle of the present embodiment is described next with reference to the drawings.

The light beam emitted from the laser source 11 is split into two polarized light beams L1, L2 having orthogonal polarization planes. One of the polarized light beams, L1, travels straight and the other L2 is reflected from the mirror 52. The two light beams L1, L2 are collected through the lens 53 and collimated through the lens 54 into two beams L1', L2'. The two beams L1', L2' are formed having orthogonal polarization planes and slightly deviated optical paths. As shown in FIG. 8, for example, L1' is polarized in a direction parallel with the page and L2' in a direction perpendicular to the page. Thus, the two collimated beams L1', L2' having orthogonal polarization planes enter the triangular prism 17 with, for example, L1' as the reference light and L2' as the measurement light. The reference light L1' and the measurement light L2' reflected from the oblique surface of the triangular prism 17 and the surface 20a of the target 20 are synthesized through the triangular prism 17 and released as a synthesized wave.

Subsequently, the spatial filter unit executes filtering. Namely, four beams released from the triangular prism 17 are led through the lens 55 into the iris 56. Only two beams of the reference light and the measurement light having orthogonal polarization planes pass the iris 56 and the others are blocked. These two beams are collimated through the lens 57 and sent to the detector unit 30 shown in the embodiment 1. The detector unit 30 generates phase-shifted interference fringes, which are captured on the camera and analyzed to compute the surface form of the target.

The principle of filtering at the spatial filter unit is described herein. The principle herein described is nothing but an example of spatial filtering and other spatial filtering may be available as well. The reference light L1' led into the triangular prism 17 is split into a reference beam L1'A, which is reflected at the oblique surface of the triangular prism 17, and a beam L1'B, which transmits through the triangular prism 17 and is then reflected at the surface 20a of the target 20. Similarly, the measurement light L2' led into the triangular prism 17 is split into a beam L2'A, which is reflected at the oblique surface of the triangular prism 17, and a measurement beam L2'B, which transmits through the triangular prism 17 and is then reflected at the surface 20a of the target 20. Thus, the triangular prism 17 releases four beams L1'A, L1'B, L2'A. L2'B though a measurement does not require the whole of these four beams. Namely, the beam L1'B of the reference light L1' is a beam reflected at the surface 20a of the target 20. Accordingly, it is not related to the measurement and causes a noise. Similarly, the beam L2'A of the measurement light L2' is a beam reflected at the oblique surface of the triangular prism 17. Accordingly, it is not related to the measurement and also causes a noise. Therefore, removal of the beams L1'B and L2'A reduces the noises and generates high-S/N interference fringes. Specifically, the surface of the target 20 is tilted at a certain angle such that only the reference beam L1'A of the reference light L1' and the measurement beam L2'B of the measurement light L2' pass through the iris 56. In accordance with this arrangement, the other beams (such as the beams L1'B and L2'A) than the reference beam L1'A and the measurement beam L2'B can not pass through the iris 56 and are blocked. As a result, only the reference beam L1'A and the measurement beam L2'B having orthogonal polarization planes can be sent to the detector unit 30.

If L2 is used as the reference light and L1 the measurement light, the surface 20a of the target 20 may be tilted in the opposite direction and adjusted such that L2'A and L1'B can pass through the iris 56. Depending on which one of the four beams generated after reflected at the reference surface and the measurement surface is used as the measurement light and as the reference beam, desired filtering can be attained only by changing the direction in which the target 20 is tilted.

The oblique incidence interferometer of the seventh embodiment geometrically rejects unnecessary components for measurements. Accordingly, it can obtain high-S/N interference fringes reliably and improve the accuracy additionally.

Eighth Embodiment

An oblique incidence interferometer according to an eighth embodiment of the present invention is described next with reference to FIG. 9, in which the same components as those in the above-described first through seventh embodiments are denoted with the same reference numerals and omitted from the following description.

Figure 9:
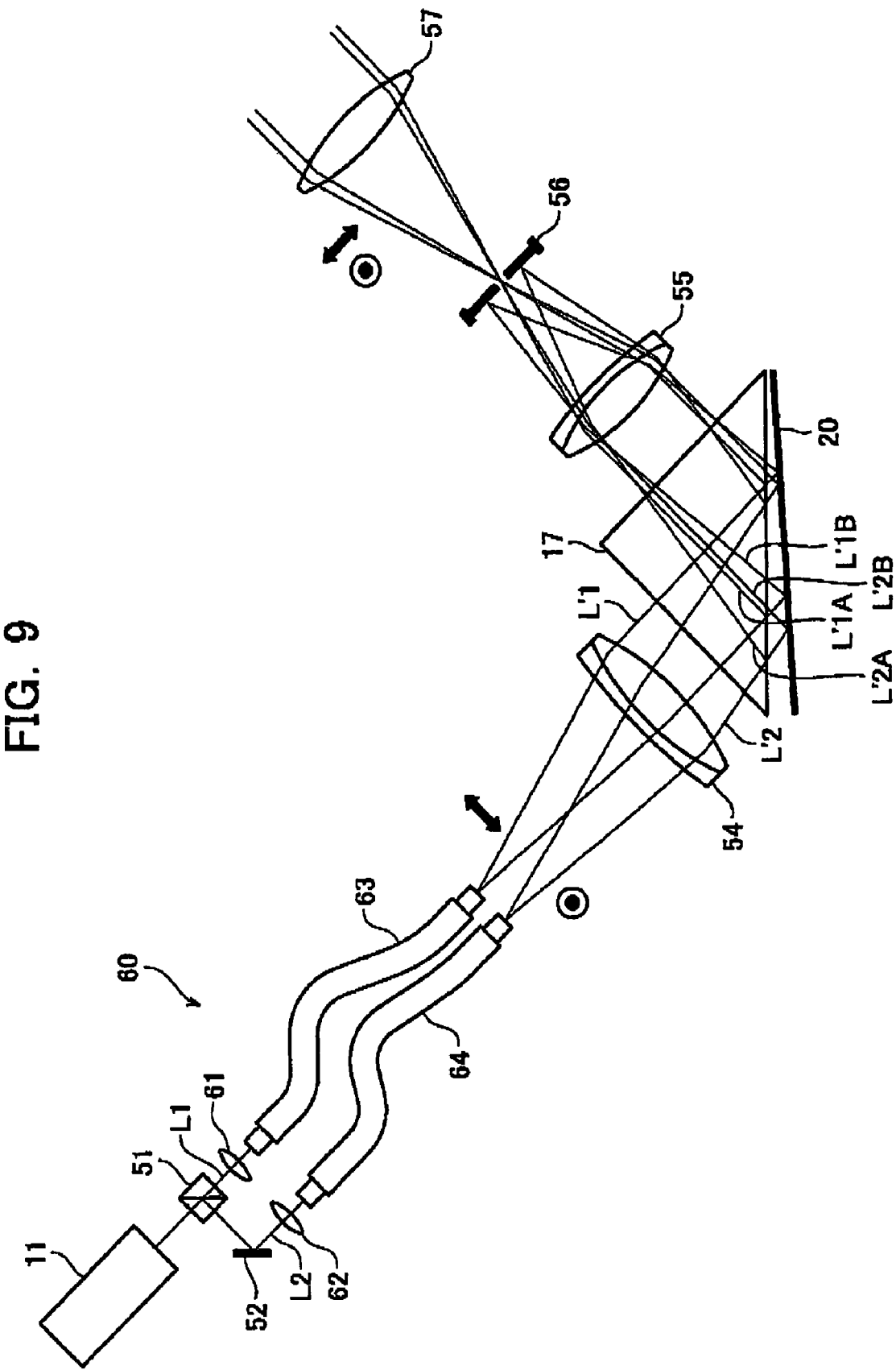
FIG. 9 shows a brief configuration of an oblique incidence interferometer according to an eighth embodiment of the present invention.
Figure 10:
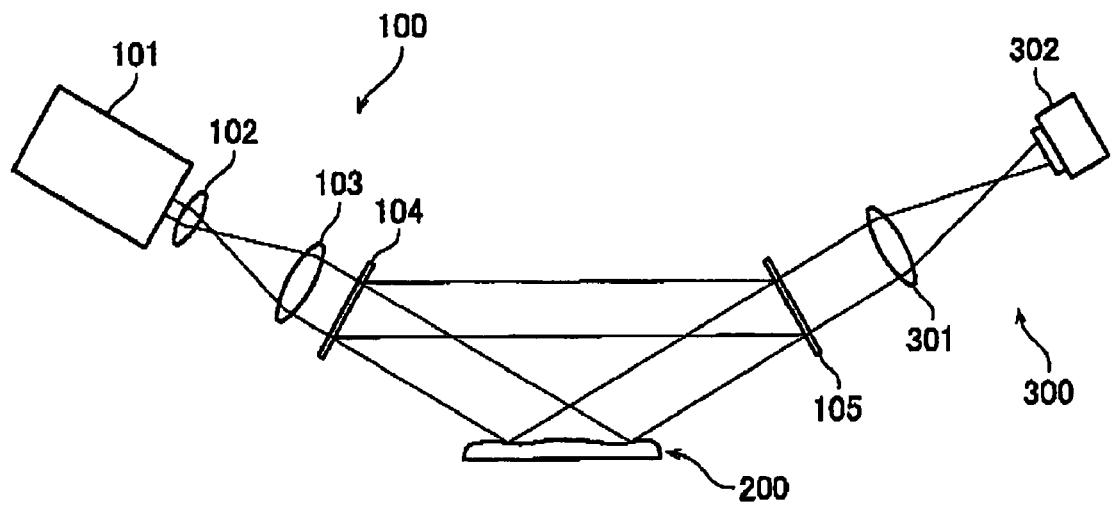
FIG. 10 shows an example of a brief configuration of an oblique incidence interferometer of prior art.
Figure 11:
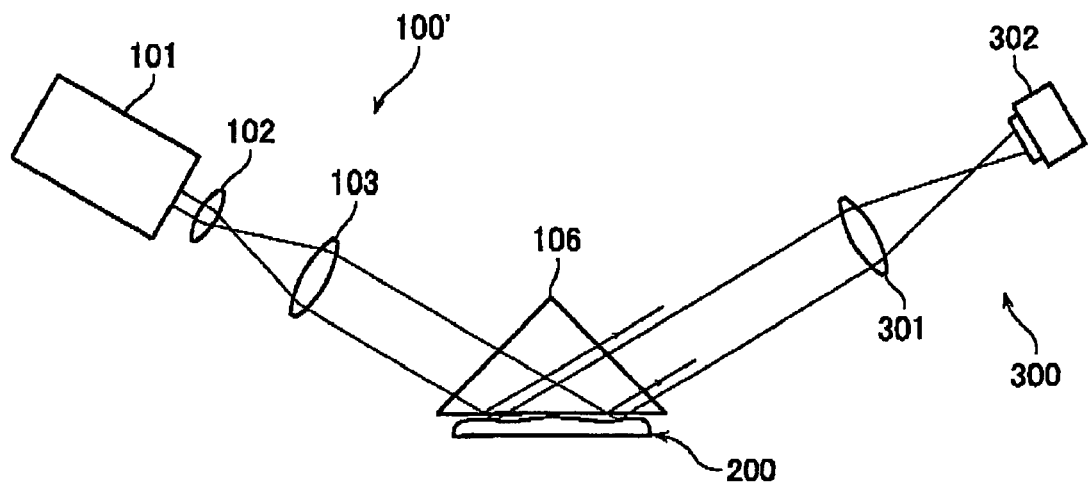
FIG. 11 shows another example of a brief configuration of an oblique incidence interferometer of prior art.

As shown in FIG. 9, in the oblique incidence interferometer of the eighth embodiment, an illuminator unit 60 is configured as follows. Namely, instead of the lens 53 for collecting the split light beams L1, L2, two optical fibers 63, 64 are used, different from the above seventh embodiment. Lenses 61, 62 are provided upstream to the two optical fibers 63, 64, respectively.

Of the two light beams L1, L2 split at a splitter element 51 and having orthogonal polarization planes, one light beam L1 travels via the lens 61 and enters the optical fiber 63 through the entry end thereof. The other light beam L2 is reflected at a mirror 52 and then travels via the lens 62 and enters the optical fiber 64 through the entry end thereof. The optical fibers 63, 64 have a function of maintaining the polarization direction. Therefore, regardless of the routes between the entry ends and the exit ends of the optical fibers 63, 64, only adjustment of the positional relations between the exit ends of the optical fibers 63, 64 and the lens 54 makes it possible to obtain collimated reference light L1' and measurement light L2' having slightly deviated optical axes and orthogonal polarization planes.

The principle of spatial filtering is similar to that in the above seventh embodiment and is omitted from the following description.

The present embodiment makes it possible not only to obtain high-S/N interference fringes reliably but also to enhance the flexibility of the optical design of the oblique incidence interferometer for a further achievement of the compactness.

OTHERS

The embodiments of the invention have been described above though the present invention is not limited to these embodiments but rather can be given various modification, additions and replacements without departing from the scope and spirit of the invention. For example, the diffraction grating 14 may be replaced with a beam splitter. In this case, polarizers may be used on the reference optical path and the measurement optical path for transmission of lights with orthogonal polarization planes. Moreover, any of waveplates and polarizers mentioned above may be omitted according to the characteristic or the performance of the optical elements used in abovementioned optical systems.

The use of a polarization beam splitter operative to separate the transmitted light and the reflected light with orthogonal polarization planes, as the beam splitter, may omit the ½-waveplate 15. In this case, a polarizer may be arranged on the reference optical path and/or the measurement optical path in accordance with the S/N ratio of the interference fringes.

Instead of the triangular prism 17, a flat beam splitter or an alternative glass substrate may be used as the reference surface. The fifth and sixth embodiments comprises the illuminator unit 10 and the detector unit 30 though they are not limited but may be replaced with the illuminator unit 10' (10") of the third (fourth) embodiment and the detector unit 30' of the second embodiment. The mount 40 (40') for target scanning may comprise the drive function of translation and rotation together. The mount 40 (40') for target scanning may comprise no mechanism for translation and rotation while the illuminator unit 10, (10', 10") and the detector unit 30 (30') may be configured to translate or rotate relative to the target 20. A means other than the iris 56 may be used for spatial filtering.

What is claimed is:

1. An oblique incidence interferometer for applying a light at a certain angle from the normal to a measurement surface of a target to be measured and measuring a light reflected from said target, comprising:

a light source;

a beam splitter/synthesizer unit which splits the light from said light source into a measurement light to be applied to said target and a reference light serving as the measurement reference, and which orthogonalizes the polarization directions of said measurement light reflected from said target and said reference light and synthesizes said lights to yield a synthesized light;

a beam splitter unit which splits said synthesized light into a plurality of split lights;

a plurality of imaging units which captures a plurality of interference fringe images formed in accordance with said plurality of split lights;

a ¼-waveplate provided on either one of an entry side and an exit side of said beam splitter unit;

a plurality of polarizers provided on imaging surfaces of said plurality of imaging units and arranged having respective different polarization axes; and an operation unit which computes a surface form of said target based on said interference fringe images captured by said imaging units and resulted from said plurality of split lights having phases shifted through said polarizers, wherein said beam splitter/synthesizer unit includes means for splitting the light from said light source into two light beams having orthogonal polarization planes and generating two collimated beams having different optical axes and a certain diameter;

a triangular prism which transmits one of said two beams therethrough and reflects the other therefrom, thereby splits said two beams into a measurement light and a reference light serving as the measurement reference, and which synthesizes said measurement light with said reference light to yield a synthesized light, and a spatial filter unit which passes said synthesized light therethrough and rejects a noise light caused from one of said two beams reflected from said triangular prism and a noise light caused from the other of said two beams transmitted through said triangular prism.

2. The oblique incidence interferometer according to claim 1, wherein said triangular prism has a coat thereon to split said measurement light and said reference light in accordance with the polarization directions.

3. The oblique incidence interferometer according to claim 1, further comprising an element arranged between said triangular prism and said target to split said measurement light and said reference light in accordance with the polarization directions.

4. The oblique incidence interferometer according to claim 1, further comprising a driver unit which causes at least one of relative translation and rotation of said target in a plane almost parallel with said target.

5. The oblique incidence interferometer according to claim 1, wherein said target is tilted at a certain angle such that said spatial filter unit forms an optical axis to pass only said synthesized light.

6. The oblique incidence interferometer according to claim 1, wherein said means for splitting the light and generating two beams includes
   a splitter element which splits the light beam from said light source into two light beams having orthogonal polarization planes,
   a first lens for collecting said two light beams, and
   a second lens for forming two collimated beams having different optical axes.

7. The oblique incidence interferometer according to claim 1, wherein said means for splitting the light and generating two beams includes
   a splitter element which splits the light beam from said light source into two light beams having orthogonal polarization planes,
   a pair of optical fibers which receives said two light beams, respectively, and
   a lens for forming two collimated beams having different optical axes, wherein
   said pair of optical fibers have a function of maintaining the polarization direction.

8. The oblique incidence interferometer according to claim 1, wherein said spatial filter unit includes
   a first lens,
   an iris located in the proximity of the focus of said first lens, and
   a second lens located downstream from said iris.

9. An oblique incidence interferometer for applying a light at a certain angle from the normal to a measurement surface of a target to be measured and measuring a light reflected from said target, comprising:
   a light source;
   a beam splitter/synthesizer unit which splits the light from said light source into a measurement light to be applied to said target and a reference light serving as the measurement reference, and which orthogonalizes the polarization directions of said measurement light reflected from said target and said reference light and synthesizes said lights to yield a synthesized light;
   a beam splitter unit which splits said synthesized light into a plurality of split lights;
   a first polarizer interposed in an optical path of a first split light split at said beam splitter unit, said first polarizer having a first polarization axis;
   a second polarizer interposed in an optical path of a second split light split at said beam splitter unit, said second polarizer having a second polarization axis set within the same quadrant as said first polarization axis;
   a third polarizer interposed in an optical path of a third split light split at said beam splitter unit, said third polarizer having a third polarization axis set within a different quadrant from said second polarization axis; and
   a ¼-waveplate interposed in said optical path of said second split light and having a fast axis orientation and a slow axis orientation almost coincident with the polarization direction of said synthesized light, wherein
   said beam splitter/synthesizer unit includes
   means for splitting the light from said light source into two light beams having orthogonal polarization planes and generating two collimated beams having different optical axes and a certain diameter,
   a triangular prism which transmits one of said two beams therethrough and reflects the other therefrom, thereby splits said two beams into a measurement light and a reference light serving as the measurement reference, and which synthesizes said measurement light with said reference light to yield a synthesized light, and
   a spatial filter unit which passes said synthesized light therethrough and reject a noise light caused from one of said two beams reflected from said triangular prism and a noise light caused from the other of said two beams transmitted through said triangular prism.

10. The oblique incidence interferometer according to claim 9, further comprising a driver unit which causes at least one of relative translation and rotation of said target in a plane almost parallel with said target.

11. The oblique incidence interferometer according to claim 9, wherein said target is tilted at a certain angle such that said spatial filter unit forms an optical axis to pass only said synthesized light.

12. The oblique incidence interferometer according to claim 9, wherein said means for splitting the light and generating two beams includes
   a splitter element which splits the light beam from said light source into two light beams having orthogonal polarization planes,
   a first lens for collecting said two light beams, and
   a second lens for forming two collimated beams having different optical axes.

13. The oblique incidence interferometer according to claim 9, wherein said means for splitting the light and generating two beams includes
   a splitter element which splits the light beam from said light source into two light beams having orthogonal polarization planes,
   a pair of optical fibers which receives said two light beams, respectively, and
   a lens for forming two collimated beams having different optical axes, wherein
   said pair of optical fibers have a function of maintaining the polarization direction.

14. The oblique incidence interferometer according to claim 9 wherein said spatial filter unit includes
   a first lens,
   an iris located in the proximity of the focus of said first lens, and
   a second lens located downstream from said iris.

* * * * *